United States Patent Office 3,096,921
Patented July 9, 1963

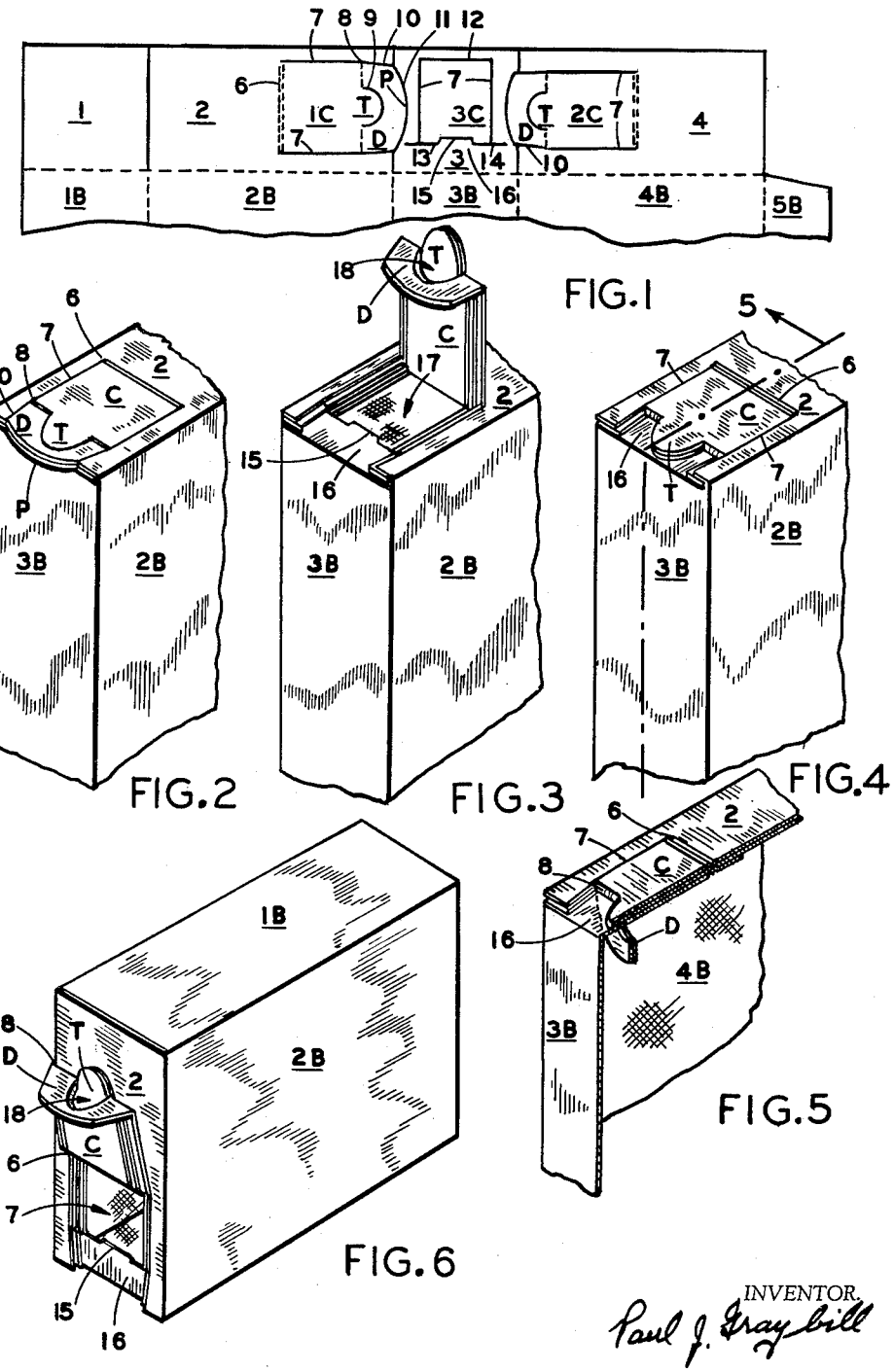

3,096,921
DISPENSING CONTAINER WITH RECLOSABLE COVER FOR DISPENSING CONTAINERS
Paul J. Graybill, Sunset Hill Drive, Pine Orchard, Conn.
Filed Oct. 24, 1960, Ser. No. 64,423
4 Claims. (Cl. 229—17)

The present invention relates to dispensing containers in general and to dispensing containers having opening and reclosing means inherent in the glue end thereof in particular.

This invention is an improvement and variation on the applicant's inventions Number 2,812,126 and Number 2,928,581. The improvement relates to the formation and positioning of the tuck tab claimed in the first mentioned patent and to the formation and positioning of the locking device claimed in the second mentioned patent.

Broad Objective

The broad objective of my invention is to provide a one piece container having inherent dispensing means in one of the multiple layered end walls thereof, said dispensing means consisting of an opening in said multiple end wall, together with a hingedly joined multiple layered cover thereto, said opening being formed by the displacement of the partially pre-cut and adhered cover as it is lifted and rotated about its hinged connection to said container wall, said cover having the edges of the two opposing lateral sides thereof so staggered as to overlap the edges of said opening, said cover to have at least a partial crease across its outer end parallel to its hinged connection, said crease so positioned that when said cover is folded downward along said crease a tuck-tab is formed coincident with the outer edge of said opening when said cover is closed and said tuck-tab is forced inwardly along the outer edge of said opening, said cover also having a crescent cut forming a pull tab in its outer area beyond said crease, said cut terminating at both ends at said crease, said cover then in one position to be adhered in one plane to said container wall forming a closure, in a second position to be torn loose therefrom and rotated about at its hinged connection, opening the dispensing aperture in said container wall, and finally in its third instance to be returned to its original general position having said tuck-tab rotated downwardly at 90° and tucked inwardly in the opening of said container closing said aperture and having said pull-tab extending forwardly to be used as a finger grip in opening said container.

This structure is especially advantageous and desirable for several reasons, (1) it is easily opened, (2) it is easily closed, (3) it is easily reopened, (4) it does not require any special machinery in forming or filling, (5) it does not require any additional stock, (6) it forms a very efficient reclosure, (7) it is useful in a wide variety of products and (8) it allows easy access to the products therein. This container is a decided advance over the containers of the previously mentioned patents in that it does not require a Van Buren Ear to form the tuck-tab and incorporates a locking device which does double duty in that it also helps seal off the closure.

The container thus in various sizes and arrangements is unusually well adapted for any and all fast pouring granular seed or powdered products where controlled dispensing is advantageous and a reclosure is required or desired.

Specific Objectives

The more specific objectives of my invention are as follows:

(1) To provide a one piece seal-flap container having inherent opening and reclosing means in one of the multiple walls thereof, said means consisting of an aperture and a multiple course cover hingedly joined at one end to said container wall, said cover in its pre-opened state to be cut releasably free from said multiple wall, each succeeding layer inwardly being smaller, thus forming staggered shoulders on the lateral edges of said opening.

(2) To provide such a container having a shoulder at the outward rim of the aperture formed from the inner course of said multiple wall, thus providing an adequate glue area sufficient to securely seal said cover to prevent accidental opening.

(3) To provide such a container having a tuck-tab formed by a crease from the outer end of said cover, said tuck-tab so positioned as to tuck inwardly of said outer shoulder when said tuck-tab is rotated downwardly at its creased articulation approximately 90° when said cover is being reclosed.

(4) To provide such a container having a pull-tab formed by an essentially crescent cut in said tuck-tab positioned outwardly from said crease, said pull-tab to facilitate the withdrawal of said tuck-tab in the reopening of said container.

(5) To provide such a container having a short tuck-slot at the outer terminal end of each lateral shoulder so positioned to allow the passage of said tuck-tab therethrough and to act as a binder thereon when said cover is reclosed.

(6) To provide such a container having tapered edges on the tuck-tab thereof to facilitate ready insertion into said tuck-slots in the closing of said cover.

(7) To provide such a container having as an optional embodiment a lock-tab consisting of a protruding portion on the inward edge of the outer shoulder thereof projecting ostensibly into said opening, said lock-tab to protrude into and occupy the aperture in said tuck-tab made vacant by reason of the formation of the pull-tab when said cover is in its closed position and said tuck-tab is tucked inwardly into said opening and said tuck slots, said protruding lock tab to thus act as a lock with said aperture in said tuck-tab.

(8) To provide such a container having a crease-cut in said forward shoulder to release the outer skin of the paper board of said shoulder when said cover is forcibly torn from said container end.

(9) To provide further such a container having the outer end of said tuck slot protruding slightly beyond the edge of the container wall when said cover is in its preopened condition, this protrusion to facilitate the opening thereof.

Designations of Illustrations

These and other objectives and advantages will become apparent as the following detailed description proceeds, when reference is made to the accompanying drawings.

FIG. 1 is a view of the inside of a portion of the blank of the container showing the cuts, creases, and crease-cuts necessary to form the dispensing means of said container, FIG. 2 is a isometric view of a portion of the container in a preopened condition showing the tuck-tab in a plane with the pull tab and cover.

FIG. 3 is also an isometric view of a portion of the container showing the container in an opened condition, having the tuck-tab rotated forward in a position to be inserted into said opening in the closing process.

FIG. 4 is an isometric view of a portion of the container showing the cover in a reclosed position with the tuck-tab being inserted inwardly, FIG. 5 is a cross sectional view of the container of FIG. 4 showing the tuck-tab especially well, FIG. 6 is an isometric view showing the container in a dispensing position.

Description and Manufacturing Procedure

Referring then to the drawings, in which the same or similar parts in the several drawings are indicated by the same number for ease in identification, FIG. 1 is a view of a portion of the inside surface of the blank showing container walls 1B, 2B, 3B and 4B, and the side glue-flap 5B which are articulated to each other in the usual way to form a four walled container having as shown in FIG. 1 the usual glue-flaps 1, 2, 3, 4 articulated thereto, three of these, 2, 3, and 4 being modified to form the various members of the novel dispensing means claimed herein. Glue-flaps 1 and 3 are folded inwardly to become the innermost layer of the container end, glue-flap 4 likewise to form the medial layer and finally glue-flap 2 to form the outer layer. Glue-flap 2 is modified by crease 6, and lateral cuts 7, which cuts are essentially parallel to each other and to the container side walls. Glue-flap 2 is also modified by creases 8, arc cut 9, tapered cuts 10 and arc cut 11. These cuts and creases form the essential features of the dispensing means of the container as relates to the exterior layer of the multiple layered container wall thus forming the outer layer of tuck-tab D, pull-tab T and cover C. Likewise glue-flap 4 is modified in precisely the same way as glue-flap 2 with the same cuts and creases so positioned and dimensioned to correspond to those of glue-flaps 2 except that lateral cuts 7 and taper cuts 10 are positioned slightly more inwardly to effect staggered edges when the two are folded inwardly and glue-flap 2 is superimposed on glue-flap 4. These cuts and creases form the second course of said cover, cover C, pull-tab T, and tuck-tab D. Glue-flap 3 is modified by parallel cuts 7, terminal joining cut 12 and stepped cut 13, which cut extends slightly beyond the terminal ends of cuts 7, forming tuck-slots 14. These cuts form a generally rectangular third layer cover 3C. Cuts 7 are positioned slightly more inwardly than cuts 7 in glue-flap 4 to form staggered edges when glue-flap 2 and 4 are superimposed thereon. Stepped cut 13 forms a lock-tab 15 and is positioned to form a shoulder 16 on the near edge of the container end to which pull-tab T and tuck-tab D is adhered when the container is in a closed condition.

These creases and cuts form the dispensing opening and reclosing means for said container when said glue-flaps are superimposed and adhered in the normal way. These dispensing means consist of aperture 17, cover C, tuck-tab D, pull-tab T, tab-lock 15, and protrusion P.

The container of this invention is cut on a steel rule die in the usual way and is pre-glued on a straight line gluer previously to being set up on a filling machine. Therefore there is no machine alteration necessary. The container is filled and glued as usual with no changes except in the steel rule die. When the container is thus filled and closed the arched cuts 11 in both the outer courses of the glue end cause the tuck-flap D to protrude slightly beyond the edge of the container wall which is the only difference in the container from the ordinary glue-end container.

When the container is to be opened protrusion P on tuck-flap D facilitates the finger gripping of this flap and enables its being torn loose from the glue end. Since the lateral cuts 7 in all three layers of the container wall are staggered inwardly the cover C is easily lifted to form the dispensing aperture 17 in the container end as the cover is rotated about crease 6.

When the container is to be reclosed the tuck-flap D is rotated downwardly slightly over 90° in reference to the cover C and is inserted into the aperture 17, the tapered edges 10 being forced into the tuck-slots 14 as the cover C is pushed downwardly until pull-tab T rests on shoulder 16. Lock-tab 15 then occupies aperture 18 in said tuck-tab D.

When the container is to be reopened pull-tab T is grasped and lifted upwardly, drawing tuck-tab D outwardly from tuck-slots 14 and rotating cover C about its hinged connection crease 6.

Novelty

It should be noted at this point how the novelty of this construction affords several beneficial results. (1) the container as described is made and packaged in the same manner as any full glue-end container. Alterations in the steel rule dies and the printing plates are the only differences. (2) There is no additional cost or increased use of material in forming this container. (3) It can be readily opened with the fingers without the use of special tools. (4) It affords ready access to and the controlled dispensing of the contained product. (5) It can be easily reclosed by rotating the tuck-tab downwardly and inserting it into the tuck-slots which have a tight friction grip therewith, thus insuring a firm reclosure. (6) A lock-tab is provided to doubly insure a closure that is not readily opened by accident. (7) Reopening is made easy by the provision of a pull-tab.

This container then in its essential form affords a very efficient and economical package for a great number of foods and other products which require an efficient reclosure, this without the cost of any special machinery to append metal or other parts to the container. The container is a decided advance in packaging, meeting a decided need in the reclosure field.

It is understood that the embodiment shown is only an example and various changes in shape, size or arrangements of parts may be resorted to without departing from the spirit of my invention or the scope of the sub-joined claims.

I claim:

1. A container formed of foldable stock, having opening and reclosing means inherent in a multiple wall thereof, said multiple wall consisting of the adhered outer, intermediary and inner glue-flaps of said container end, said opening means consisting of an essentially rectangular multiple paneled cover, hingedly articulated to said multiple wall on its innermost edge and cut releasably free from said container wall on its lateral edges, said innermost panel also being cut releasably free on its front edge, said cut being positioned somewhat inwardly from the edge of said container forming a shoulder adjacent to said container edge, each panel of said cover being smaller than the one immediately outwardly, thus forming staggered edges about said cover, said cover in one position to be an essential part of said container end, each panel thereof lying in the same plane as the corresponding panel of said container end, effecting a complete closure, said cover in another position being torn free on three edges thereof and rotated about on its hinged connection forming an aperture in said container end, said cover having articulated to its two outer panels by hinged connection, a tuck-tab formed by a transverse crease thereacross essentially parallel to said hinged connection, said tuck-tab in one position being adhered to said shoulder and being in the same plane as the releasably joined panels, and in another position being torn free therefrom and positioned into said aperture at essentially 90° to said container end when said cover is in a reclosed position, said cover having articulated to at least one of its panels a pull-tab being formed by a crescent cut arching outwardly from said hinged connection, said pull-tab being positioned on said shoulder, being useful in reopening said cover, said shoulder having articulated to its inner edge a lock-tab protruding ostensibly into said aperture, and being so positioned and dimensioned as to occupy the crescent aperture in said tuck-tab, said crescent aperture having been formed by said crescent cut which also formed said pull-tab, said lock-tab and said crescent aperture forming a locking means holding said cover in a secured closed position.

2. The container of claim 1 having tuck-slots adjacent to the outward periphery of said aperture so positioned and dimensioned as to allow the passage and frictional retention of the lateral edges of said tuck-tab when said tuck-tab is forced inwardly in the closing operation.

3. The container of claim 2 in which said tuck-tab has tapered lateral edges to facilitate the easy insertion thereof into said tuck-slots.

4. The container of claim 1 having a protrusion articulated to the free end of said tuck-tab, said protrusion to extend slightly beyond the edge of said container end to facilitate the initial opening of said container.

References Cited in the file of this patent
UNITED STATES PATENTS

| | | |
|---|---|---|
| 2,360,415 | Gilbert | Oct. 17, 1944 |
| 2,470,388 | Ball | May 17, 1949 |